(12) United States Patent
Morovic et al.

(10) Patent No.: US 10,311,328 B2
(45) Date of Patent: Jun. 4, 2019

(54) METHOD AND APPARATUS FOR VALIDITY DETERMINATION OF A DATA DIVIDING OPERATION

(71) Applicant: HEWLETT-PACKARD DEVELOPMENT COMPANY, L.P., Houston, TX (US)

(72) Inventors: Peter Morovic, Sant Cugat del Valles (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/328,342

(22) PCT Filed: Jul. 29, 2014

(86) PCT No.: PCT/EP2014/066227
§ 371 (c)(1),
(2) Date: Jan. 23, 2017

(87) PCT Pub. No.: WO2016/015752
PCT Pub. Date: Feb. 4, 2016

(65) Prior Publication Data
US 2017/0213102 A1    Jul. 27, 2017

(51) Int. Cl.
*G06K 9/46* (2006.01)
*H04N 1/60* (2006.01)

(52) U.S. Cl.
CPC ......... *G06K 9/4652* (2013.01); *H04N 1/6008* (2013.01)

(58) Field of Classification Search
CPC .. G06K 9/4652; H04N 1/6008; H04N 1/6058; H04N 1/6061; G06F 11/008;
(Continued)

(56) References Cited

U.S. PATENT DOCUMENTS 6,122,628 A    9/2000 Castelli et al.
6,154,746 A    11/2000 Berchtold et al.
(Continued)

FOREIGN PATENT DOCUMENTS

AU    2009227778 A1    5/2011
CN    101916359 A    12/2010
(Continued)

OTHER PUBLICATIONS

M. Bakke, Arne & Farup, Ivar & Y Hardeberg, Jon. (2004). Multispectral gamut mapping and visualization: a first attempt. Proceedings of SPIE—The International Society for Optical Engineering. 10.1117/12.586225.*

(Continued)

*Primary Examiner* — Kim Y Vu
*Assistant Examiner* — Michael J Vanchy, Jr.
(74) *Attorney, Agent, or Firm* — HP Inc. Patent Department

(57) ABSTRACT

Embodiments of the present invention provide a method of determining whether data exceeds a validity range of an operation, comprising dividing operation data indicative of a range of validity of the operation into a plurality of chunks, determining a partial convex hull for each of the plurality of chunks, determining a convex hull for the operation data based on the plurality of partial convex hulls, and determining whether the data exceeds the validity range of the operation data based on the convex hull.

18 Claims, 4 Drawing Sheets

(58) Field of Classification Search
CPC .............. G06F 11/079; G06F 11/0793; G06F 11/3612; G06F 15/00; G06F 21/554
See application file for complete search history.

(56) References Cited

U.S. PATENT DOCUMENTS

| | | | |
|---|---|---|---|
| 2004/0100643 A1* | 5/2004 | Jones | H04N 1/54 358/1.9 |
| 2007/0058865 A1 | 3/2007 | Li et al. | |
| 2011/0033108 A1 | 2/2011 | Tin | |
| 2011/0286628 A1 | 11/2011 | Goncalves et al. | |
| 2013/0198565 A1* | 8/2013 | Mancoridis | G06F 11/008 714/26 |

FOREIGN PATENT DOCUMENTS

| | | |
|---|---|---|
| CN | 103236077 A | 8/2013 |
| TW | 200838316 A | 9/2008 |
| WO | WO2012122309 A3 | 9/2012 |

OTHER PUBLICATIONS

PCA data preprocessing for neural network-based detection of parametric defects in analog IC P. Malosek; V. Stopjakova 2006 IEEE Design and Diagnostics of Electronic Circuits and systems Year: 2006 pp. 129-133.*

Sifting of a Potent Convex Hull Algorithm for Scattered Point Set Using Parallel Programming Amitkumar S. Manekar; Malti Nagle; Pankaj Kawadkar; Hitesh Gupta 2013 5th International Conference and Computational Intelligence and Communication Networks Year: 2013 pp. 556-560.*

Convex Hull Covering of Polygonal Scenes for Accurate Collision Detection in Games; Rong Liu et al (XP 55180823A).

Double Description Method Revisited; Komei Fukuda 1 and Alain Prodon 2 (1-Institute for Operations Research, ETHZ, CH-8092 Zurich, Switzerland 2—Department of Mathematics, EPFL, CH-1015 Lausanne, Switzerland)(XP47002163A).

Gonzalez-Escribano, a. et al.; Parallelization Alternatives and Their Performance for the Convex Hull Problem; Applied Mathematical Modeling 30; Jul. 2006; pp. 563-577.

Multispectral Gamut Mapping and Visualization—a First Attempt Ame M. Bakke, Ivar Farup, and Jon Y. Hardeberg Gjøvik University College, P.O. Box 191, N-2818 Gjøvik, Norway (XP55180567A).

Revisiting speetrat Printing: A Data Driven Approach Peter Marovic, Jan Marovic, Jodi Arnabat and Juan Manual Garcia-Reyero Hewlett Packard and Company, Sant Cugat del Valles, Catatonia, Spain (XP 8172408A).

* cited by examiner

METHOD AND APPARATUS FOR VALIDITY DETERMINATION OF A DATA DIVIDING OPERATION

BACKGROUND

In the field of imaging, such as image correction, printing etc., it is often required to apply solutions such as correction techniques, colour models colour mapping algorithms etc., to input data. However such solutions have a range of validity for which they are known to work. The range of validity often, although not exclusively, derives from measured data from which the solution is derived. For example a correction method may be derived from a range of reflectances, a colour mapping algorithm may be based upon a range of ink-vectors and a colour profile may be based upon a range of measurements. The data on which a solution is based will hereinafter be referred to as operation data.

If a solution is applied to image data outside of the operation data on which the solution is based, then artefacts may be present in output data or failure of the solution may arise.

It is au object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention provide methods and apparatus for validity checking. Validity checking comprises determining whether input data, on which it is intended to perform an operation, falls outside of a domain or range of operation data on which the operation is based or is known to be valid. For example, to determine whether the input data falls outside of data on, which an algorithm is based. The operation may be a correction method, a colour model, performance of a reference system etc. If the input data falls outside of the domain or range of the operation data then a warning may be generated, the operation stopped or an alternative, sometimes less accurate, operation may be performed which may be more robust to extrapolation.

A convex hull or convex envelope may be used to determine a boundary or extent of a set of data, that is the data's extreme vertices, such as operation data. For data having a large number of dimensions, such as N>5 where N is the number of dimensions of the data set, computation of a convex hull can be problematic. Most convex hull computation methods are intended for use with data having two or three dimensions. However reflectance data is typically 16 or 31, or higher, dimensional; ink vectors may have between 4 and 12 dimensions; and 3D object descriptions for print may also have additional dimensions such as material properties and colorimetry resulting in a total of 4 (3D coordinates+material), 7 (+XYZ colorimetry) or more dimensions. It will be appreciated that these numbers of dimensions are merely illustrative. Similarly computing a convex hull for a large number of data points, or a large number of data points also having a large number of dimensions, can be equally problematic, as will be appreciated.

Figure 1:
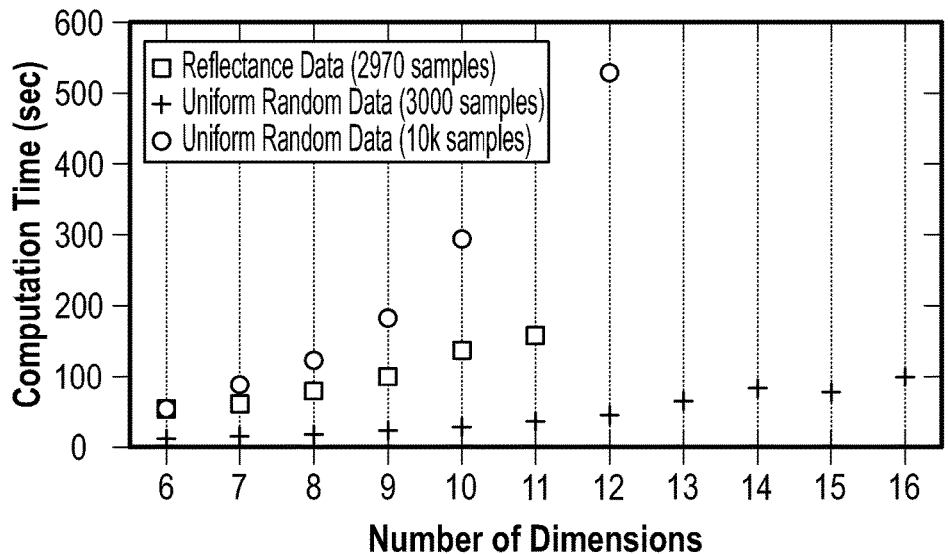
FIG. 1 shows an illustration of computing time for computing a convex hull for various data.

FIG. 1 illustrates computation times for a convex hull using a double-description method (cdd) by Komei Fukuda for data sets comprising various numbers of samples and dimensions. As can be appreciated, increasing numbers of samples and dimensions of the data significantly increases the computation time. For a relatively small set of data (in this case 3000 samples) this method is useful up to 16 dimensions and perhaps beyond. However for rank-deficient data which is not fully dimensional or is clustered, or for large numbers of samples, the method slows down considerably. Therefore the speed of convex hull determination using aid depends upon one or more of: the true dimensionality of the data (uniform random points compute faster than, for example, reflectance data); the nominal dimensionality of the data; and the number of sample points.

Figure 2:
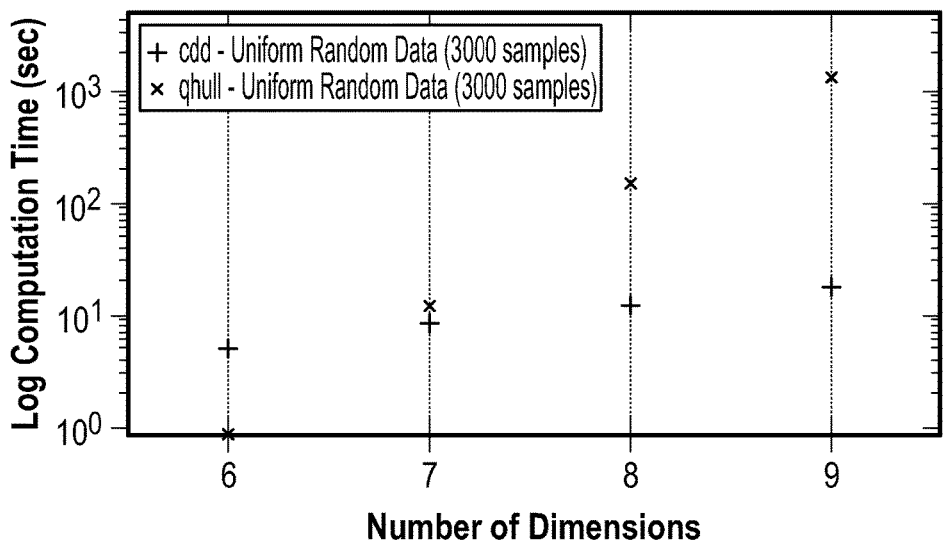
FIG. 2 shows a further illustration of computing time for computing a convex hull for various data.

FIG. 2 illustrates computation times for a convex hull using a process provided in MATLAB called convhulln (which in turn is based on an open source qhull library) for data sets comprising various numbers of samples and dimensions. It will be noted that, unlike FIG. 1, the time axis is logarithmic. Whilst this technique is faster at six dimensions it can be appreciated that it rapidly slows above eight dimensions. Therefore embodiments of the invention aim to improve usability with data having larger numbers of dimensions, particularly N>6, and/or numbers of data points.

Figure 3:
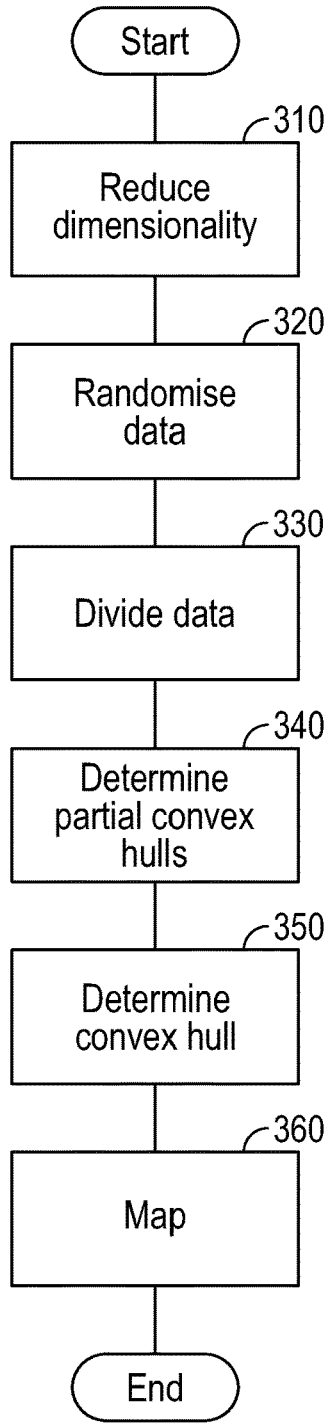
FIG. 3 shows a method according to an embodiment of the invention.

FIG. 3 illustrates a method 300 according to an embodiment of the invention. The method 300 is a method of determining a convex hull for operation data to enable validity checking of input data.

Figure 4:
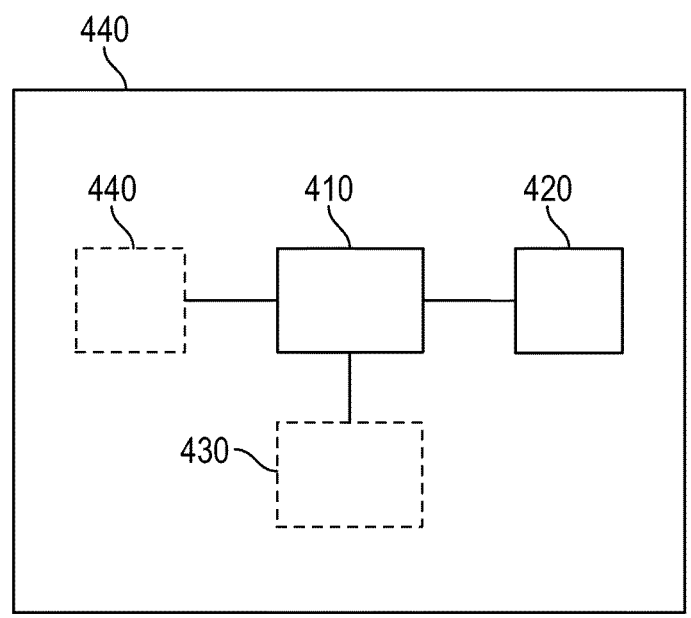
FIG. 4 shows a system according to an embodiment of the invention.

The method shown in FIG. 3 will be described with reference to a system 400 illustrated in FIG. 4. The system 400 comprises a processing unit 410 for executing instructions forming computer software for implementing a method according to an embodiment of the invention. The processing unit 410 may comprise a plurality of processors and/or processing cores each capable of independently executing instructions. The processing unit 410 may comprise one or more CPUs, GPUs FPGAs or the like. The software may be stored in a memory 420 of the system which may comprise a read-only portion storing the computer-executable instructions. The memory 420 may also comprise a rewritable portion for storing data during operation of the system 400. The memory 420 may store input data for which it is required to determine the validity of an operation according to an embodiment of the invention. The memory 420 may alternatively or additionally store the data on which the operation is based, such as the operation data, for which a convex hull will be determined. The data on which the operation is based will hereinafter be referred to as operation data. It will be realised that the memory 420 may only store a representative portion of the data on which the operation is based, such that the validity of the operation may be checked using the representative operation data. The system 400 may further comprise, in some embodiments, a I/O unit 430 and for a 440 printing unit 440. The I/O unit 440 may comprise one or more of a device for communicating data with other apparatus such as via a network which may be a wired or wireless connection; a device for receiving a user input such as via one or more keys or buttons; and an output device for outputting information to a user such as in the form of a display device. In some embodiments the device for receiving the user input and the output device may be combined, for example in the form of a touch-sensitive display device. The printing unit 440 is for printing an image corresponding to image data which may be stored in the memory 420. The image data may be based upon the input data for which it is required to validity check the operation.

Returning to FIG. 3, the method 300 comprises a step 310 of reducing a dimensionality of the operation data. Step 310 may comprise sub-steps of determining a lower dimensionality of the operation data and mapping the operation data to a model on the basis of the determined lower number of dimensions.

The operation data may have a number of dimensions defined by $N \times N_{smp}$. The output of step 310 is data having dimensions $N \times N_D$ where $N_D < N_{smp}$. The operation data may be stored in the memory 420 of the system 400 and the data output by step 310 may also be stored in the memory 420.

Step 310 may comprise performing linear or non-linear dimensionality reduction on the operation data. The linear dimensionality reduction may comprise performing Principal Component Analysis (PCA) on the operation data to determine a "true" dimensionality of the operation data. In other words, in the first sub-step of step 310 it is determined whether a number of dimensions of the operation data can be reduced. The PCA determines a value for the number of reduced dimensions $N_D$ such that above a predetermined variance is represented in the data where the predetermined variance may be above 90%, 95%, substantially 100% or exactly 100%. If $N_D$ is less than $N_{smp}$ then the second sub-step of step 310 is performed, or else if $N_D$ is equal to $N_{smp}$ then the method moves to step 320.

The second sub-step of step 310 comprises performing a linear mapping of the $N \times N_{smp}$ operation data in $N_{smp}$ space to the lower-dimensional $N_D$ space. This reduces the operation data from $N \times N_{smp}$ to $N \times N_D$ where $N_D$ is less than $N_{smp}$ thereby reducing the number of dimensions of the operation data.

The second sub-step may be referred to as linear subspace projection. In this sub-step a plurality of data points in $N_{smp}$-dimensions are mapped to closest points in a $N_D$-dimensional subspace defined by a set of $N_{smp}$-vectors in this space (a $N_D \times N_{smp}$ matrix B where the $N_D$ rows of the matrix are the vectors that define the axes of the $N_{smp}$-dimensional subspace, hence $N_D$ of the $N_{smp}$-vectors). Where these arise from PCA the vectors are also orthonormal. If we denote this set of vectors B then the projection matrix is defined as $P=B*B^T*B$ (where $B^T$ is the transpose). Since B is orthonormal $B^T*B$ is the identity matrix and hence P=B and if S is the data set of N points in $N_{smp}$ dimensions represented in a $N \times N_{smp}$ matrix then its representation in the reduced dimensional domain $N_D$ is $Q=S^T*B$ such that Q is $N \times N_D$.

Figure 5:
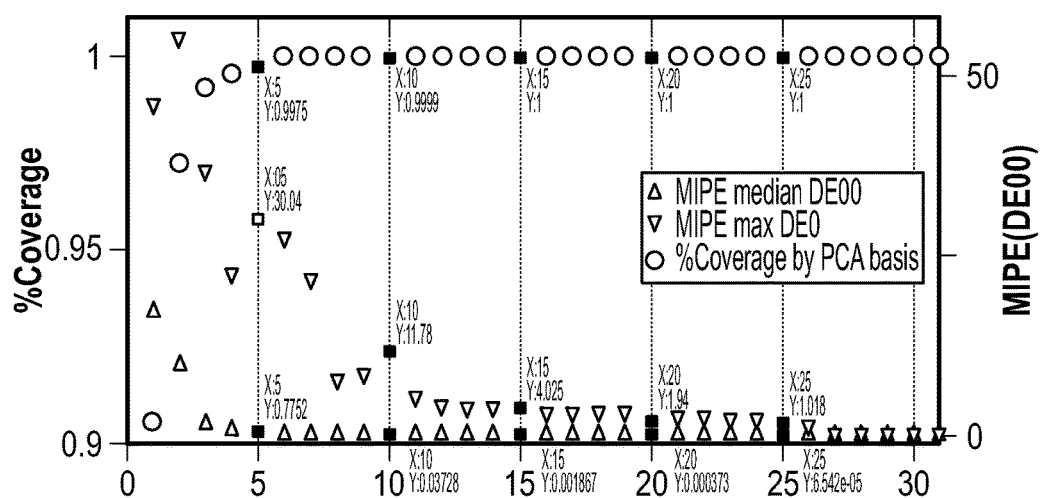
FIG. 5 illustrates coverage of reflectance data having differing numbers of dimensions.

FIG. 5 illustrates coverage of spectral reflectance data having differing numbers of dimensions. The coverage in % is determined using principal component analysis (PCA) and also Multi-Illuminant Parameter Delta E (MIPE) colour difference (DE00). The reflectance data comprises 54,000 samples. It can be appreciated from FIG. 5 that lower dimensional data can represent data having higher dimensions well until a lower cut-off point.

It will be noted that operating at a lower dimensionality does not imply lower precision. Extreme vertices of lower dimension data are likely to be a subset of extreme vertices at higher dimensions as well, although a part of a convex hull volume may be sacrificed by the reduction in dimensions.

In optional step 320 the operation data is re-ordered to reduce any structure of the data. It will be realised that step 320 may be performed prior to, or after as shown in FIG. 3, step 310. In step 320 the data set is re-ordered to increase a randomisation of the data. If the data set has an intrinsic order this may be detrimental to later steps of the method.

In optional step 330 it is determined whether the data has greater than a predetermined number of samples. If the data has greater than a predetermined number K of samples where K may be 3000, 5000 or another value of samples may be chosen, the data is divided into chunks of data. Each chunk of data may be equally sized and may comprise a predetermined number of samples. The predetermined number of samples is a number of samples which may be processed by each processor or core of the processing unit 410. The number of samples may also be determined depending on the available number of processors or CPU or GPU cores that can compute in parallel. Each chunk comprises K samples although it will be realised that other numbers may be chosen.

In step 340 a partial convex hull is determined for each of the chunks determined in step 330. The determination of each partial convex hull is allocated to a respective core or processor, hereinafter generally referred to as a processing unit, of the processing unit 410. The determination of each partial convex hull may therefore be performed at least partly in parallel by the respective processing units, in order to reduce a processing time of step 340.

Each respective processing unit may determine the partial convex hull (a convex hull for each respective chunk of data) using a process such as css, qhull or convhulln as referred to above. It will also be realised that other processes may be used. Furthermore it will be realised that each processing unit may determine a partial convex hull for a plurality of chunks i.e. the number of chunks may be more than the number of processing units and that each processing unit may not be allocated the same number of chunks. Step 340 thus determines extreme vertices of a plurality of partial convex hulls. For every i-th data chunk $K_i \times N_{smp}$ the convex hull computation returns a new set of extreme vertices $P_i \times N_{smp}$ where $P_i <= K_i$ (it is equal if and only if all points of the chunk are already on the convex hull). The extreme vertices may then be joined into a single $L \times N_D$ data set whereby L is the sum of the partial convex hull computations on the $K_i \times N_D$ data sets such that $L=P_1+P_2+P_3 \ldots$ and such that $L<=N$ (the sum of extreme vertices is less than or equal to all initial data points, equality being the case if and only if all initial points were on the convex hull to begin with).

If the number of samples L is larger than a predetermined threshold, steps 330 and 340 may be repeated. The repetition further divides the data points into chunks and computes partial convex hulls for those chunks. Furthermore if L is similar to N after the division into chunks and subsequent partial convex hull computation, the original data set was already largely on the convex hull and further repetition is not useful. Therefore the method 300 may comprise a decision step in which it is determined whether to repeat steps 330-340 one or more times.

In step 350 a total convex hull of the vertices of the partial convex hulls arising from step 340 is determined. That is, in step 350 a convex hull of joint convex hulls from step 340 is determined. The result is a set of $M \times N_D$ points in a linear model basis whereby M is the number of vertices strictly on the convex hull of the joint data set that resulted from the partial convex hull computations on the $K_i \times N_D$ chunks, and M<=L (the overall convex hull has at most as many vertices as the sum of the partial convex hulls).

In step 360 the points having $N_D$ dimensions are projected or mapped back to $N_{smp}$ dimensions to return data in the form $M \times N_{smp}$.

In a further step, not shown in FIG. 3, which may be performed after step 360, input data can be compared against the convex hull in $M \times N_{smp}$ in order to determine whether the input data falls outside of the convex hull for the operation data. This may be achieved in a number of ways, for example re-expressing the convex hull as a set of half-spaces (linear inequalities) which allows for fast inclusion checking by means of evaluating a new data point against all linear inequalities, if the data point satisfies all inequalities (that define the convex hull), this means that it is inside the convex hull, otherwise it is outside. Other methods, such as a determinant-based method etc. are known to the skilled person.

If the input data falls outside, at least partly, the convex hull then a warning may be output that the a validity of an operation to be performed on the input data is not guaranteed. In another embodiment the operation may be stopped if the input data falls outside of the convex hull, or only partial results may be computed for a portion of the input data that satisfies the convex hull (i.e. falls within the convex hull). Alternatively a different method or operation may be performed on the input data which falls outside of the convex hull. In this case a warning may be provided, for example a warning about a heterogeneity of methods used.

Figure 6:
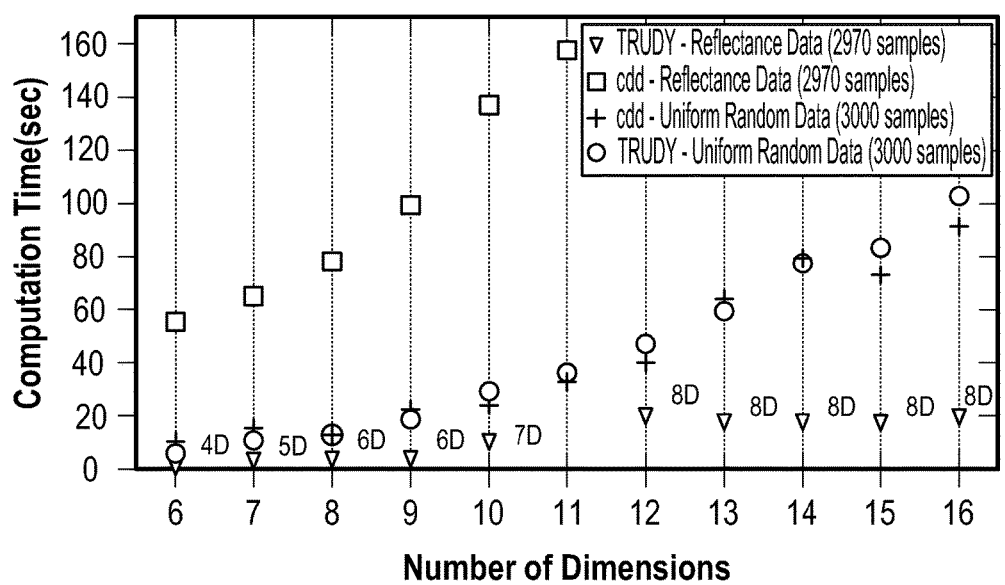
FIG. 6 illustrates a performance of a method according to an embodiment of the invention.

FIG. 6 illustrates a comparison of cdd against a method of determining a convex hull according to an embodiment the present invention for data having a variety of dimensions. As can be appreciated from FIG. 5 for reflectance data the method according to an embodiment of the invention significantly outperforms the cdd method.

Whilst the above embodiments have been described with reference to reflectance data, it will be realised that embodiments of the invention are not necessarily restricted to use with such data. Embodiments of the invention may be used with any of the following:

Reflectance data which is typically high dimensional (common formats are 16, 31 or 101 sampling dimensions), typically well representable by PCA.

Colorimetric data (CIE XYZs, LABs, etc.) which while not high dimensional may comprise large numbers of samples.

Ink-vectors, the dimensionality of which depends directly on, a number of inks, e.g. 4 to 12, although more may be envisaged.

HANS NPacs which describes print as 'Neugebauer Primary area coverages' which are effectively vectors not in ink-space but in Neugebauer Primary' space which is the domain of all ink-overprints. For example for a 4-ink binary (some ink, no ink) printing system there exists $2^4=16$ dimensions, wherein if there are two drop sizes (no ink, 1 drop, 2 drops) there exists $3^4=81$ dimensions. As can be appreciated there may be a large number of dimensions. In a farther example a colour look-up table indexed in RGB may comprise e.g. $17^3=4913$ samples) in an 81 dimensional domain.

3D printing data which may extend beyond 3 dimensions (x, y, z coordinates) particularly when involving further properties at every spatial location, such as material or colour. Therefore the data comprises 4 (3 coordinates+1 material), 7 (3 coordinates, 1 material, 3 color) or more dimensions and also involves very large sets of data points (10 K+).

As can be appreciated embodiments of the present invention provide methods and apparatus for determining a validity of an operation. The methods and apparatus comprise determining a convex hull based upon a plurality of partial hulls.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method executed by a system comprising a hardware processor, comprising in response to determining that a number of samples of operation data indicative of a range of validity of an operation to be performed by the system on image data exceeds a threshold, dividing the samples of operation data into a plurality of chunks, wherein a chunk of the plurality of chunks includes multiple samples of operation data;

determining respective partial convex hulls for respective chunks of the plurality of chunks;

determining a convex hull for the operation data based on a sum of the partial convex hulls that joins the partial convex hulls to produce the convex hull for the operation data;

determining whether the image data exceeds the range of validity of the operation data based on the convex hull for the operation data; and modify the operation performed by the system on the image data in response to determining that the image data exceeds the range of validity of the operation data.

2. The method of claim 1, comprising determining the operation data by reducing a number of dimensions in initial operation data.

3. The method of claim 2, wherein the determining of the operation data comprises performing a principal component analysis (PCA) on the initial operation data.

4. The method of claim 2, comprising mapping the operation data to a model based on the reduced number of dimensions.

5. The method of claim 4, wherein the model is a linear model.

6. The method of claim 2, wherein reducing the number of dimensions in the initial operation data comprises iteratively reducing the number of dimensions in the initial operation data in response to determining that a number of samples in the operation data exceeds a threshold number.

7. The method of claim 1, comprising randomizing the operation data.

8. The method of claim 1, wherein at least some of the partial convex hulls are determined in parallel by respective processing units.

9. The method of claim 1, wherein the determining of whether the image data exceeds the range of validity of the operation data comprises mapping vertices of the convex hull to original dimensions of the operation data and comparing the image data against vertices in the original dimensions.

10. The method of claim 1, wherein modifying the operation performed by the system comprises modifying a printing operation.

11. The method of claim 1, wherein modifying the operation performed by the system comprises stopping the operation or changing a characteristic of the operation.

12. An apparatus comprising:
a processor; and
a non-transitory storage medium storing instructions executable on the processor to:
in response to determining that a number of samples of operation data indicative of a range of validity of an operation to be performed by a system on image data exceeds a threshold, divide the samples of operation data into a plurality of chunks;
determine partial convex hulls for respective chunks of the plurality of chunks;
determine a convex hull for the operation data based on joining the partial convex hulls by summing the partial convex hulls;
determine whether the image data exceeds the range of validity of the operation data based on the convex hull for the operation data; and
modify the operation of the system on the image data in response to determining that the image data exceeds the range of validity of the operation data.

13. The apparatus of claim 12, wherein the-instructions are executable on the processor to determine the operation data by reducing a number of dimensions in initial operation data.

14. The apparatus of claim 13, wherein the-instructions are executable on the processor to map the operation data to a model based on the reduced number of dimensions.

15. The apparatus of claim 12, comprising a plurality of processors to determine the partial convex hulls in parallel.

16. The apparatus of claim 12, wherein the apparatus is an image processing device, and the operation comprises an operation of the image processing device.

17. A non-transitory storage medium storing machine-readable instructions that upon execution cause a system to:
in response to determining that a number of samples of operation data indicative of a range of validity of an operation to be performed by the system on image data exceeds a threshold, divide the samples of operation data into a plurality of chunks;
determine partial convex hulls for respective chunks of the plurality of chunks;
determine a convex hull for the operation data based on joining the partial convex hulls by summing the partial convex hulls;
determine whether the image data exceeds the range of validity of the operation data based on the convex hull for the operation data; and
modify the operation of the system on the image data in response to determining that the image data exceeds the range of validity of the operation data.

18. The non-transitory storage medium of claim 17, wherein modifying the operation comprises modifying a printing operation.

* * * * *

UNITED STATES PATENT AND TRADEMARK OFFICE
CERTIFICATE OF CORRECTION

PATENT NO. : 10,311,328 B2
APPLICATION NO. : 15/328342
DATED : June 4, 2019
INVENTOR(S) : Peter Morovic et al.

Page 1 of 1

It is certified that error appears in the above-identified patent and that said Letters Patent is hereby corrected as shown below:

In the Claims

In Column 8, Line 13, in Claim 13, delete "the-instructions" and insert -- the instructions --, therefor.

In Column 8, Line 17, in Claim 14, delete "the-instructions" and insert -- the instructions --, therefor.

Signed and Sealed this
Tenth Day of September, 2019

Andrei Iancu
*Director of the United States Patent and Trademark Office*